US008375405B2

(12) United States Patent
Morris et al.

(10) Patent No.: US 8,375,405 B2
(45) Date of Patent: Feb. 12, 2013

(54) CONTEXTUAL TELEVISION ADVERTISEMENT DELIVERY

(75) Inventors: Ronald A. Morris, San Francisco, CA (US); Peter Barrett, San Francisco, CA (US); David Sloo, Menlo Park, CA (US); Ted Ludvig, Redwood City, CA (US); Wieyang Lin, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 829 days.

(21) Appl. No.: 11/717,458

(22) Filed: Mar. 13, 2007

(65) Prior Publication Data

US 2008/0229354 A1 Sep. 18, 2008

(51) Int. Cl.
*H04N 7/10* (2006.01)
(52) U.S. Cl. ......................................................... 725/34
(58) Field of Classification Search .................... None
See application file for complete search history.

(56) References Cited

U.S. PATENT DOCUMENTS

| 6,698,020 | B1 | 2/2004 | Zigmond et al. | |
|---|---|---|---|---|
| 7,051,351 | B2 | 5/2006 | Goldman et al. | |
| 7,080,392 | B1 * | 7/2006 | Geshwind | 725/34 |
| 7,286,651 | B1 * | 10/2007 | Packingham et al. | 379/88.14 |
| 7,313,802 | B1 * | 12/2007 | Tomsen | 725/23 |
| 7,624,408 | B2 * | 11/2009 | Toguri | 725/34 |
| 7,752,642 | B2 * | 7/2010 | Lemmons | 725/32 |
| 2001/0018766 | A1 * | 8/2001 | Morita et al. | 725/32 |
| 2002/0178445 | A1 * | 11/2002 | Eldering et al. | 725/32 |
| 2003/0028432 | A1 | 2/2003 | Troyansky et al. | |
| 2003/0076347 | A1 | 4/2003 | Barrett et al. | |
| 2004/0003398 | A1 * | 1/2004 | Donian et al. | 725/34 |
| 2004/0045028 | A1 | 3/2004 | Harris | |
| 2004/0064833 | A1 | 4/2004 | Lee et al. | |
| 2004/0243623 | A1 | 12/2004 | Ozer et al. | |
| 2005/0096978 | A1 | 5/2005 | Black | |
| 2005/0216932 | A1 * | 9/2005 | Danker | 725/32 |
| 2006/0080167 | A1 | 4/2006 | Chen et al. | |
| 2006/0117365 | A1 * | 6/2006 | Ueda et al. | 725/112 |
| 2006/0179453 | A1 | 8/2006 | Kadie et al. | |
| 2007/0083754 | A1 * | 4/2007 | Bacon | 713/160 |
| 2007/0124795 | A1 * | 5/2007 | McKissick et al. | 725/135 |
| 2007/0204292 | A1 * | 8/2007 | Riedl et al. | 725/34 |

(Continued)

FOREIGN PATENT DOCUMENTS

WO WO03053039 A2 6/2003

OTHER PUBLICATIONS

Erdogan, Engin, "An On-Demand Advertising Model for Interactive Television", Date: Apr. 2004, http://idt.gatech.edu/ms_projects/eerdogan/enginerdogan_masters_designdoc.pdf.

(Continued)

*Primary Examiner* — Vivek Srivastava
*Assistant Examiner* — Rong Le
(74) *Attorney, Agent, or Firm* — Hope Baldauff Hartman, LLC (57) ABSTRACT

Various technologies for delivering contextual television advertisement are described. A user selection of a media title is received. The media title has an associated set of contextual metadata that includes information regarding the media title. A request for the media title is forwarded to a first server and an advertisement request including the set of contextual metadata is forwarded to a second server. The second server uses the set of contextual metadata to retrieve contextual television advertisement information. The contextual television advertisement information and the media title are received from the second server and the first server respectively. Also, the contextual television advertisement information and the media title are played.

18 Claims, 8 Drawing Sheets

U.S. PATENT DOCUMENTS

| | | | |
|---|---|---|---|
| 2007/0300263 A1* | 12/2007 | Barton et al. | 725/60 |
| 2008/0092159 A1* | 4/2008 | Dmitriev et al. | 725/34 |
| 2008/0115161 A1* | 5/2008 | Kurzion | 725/32 |
| 2008/0126226 A1* | 5/2008 | Popkiewicz et al. | 705/27 |
| 2008/0276271 A1* | 11/2008 | Anderson et al. | 725/34 |
| 2009/0019485 A1* | 1/2009 | Ellis et al. | 725/40 |
| 2009/0083788 A1* | 3/2009 | Russell et al. | 725/34 |

OTHER PUBLICATIONS

Ranganathan et al., "Advertising in a Pervasive Computing Environment", Date: 2000, http://gaia.cs.uiuc.edu/papers/mobicomm02.pdf#search=%22IEEE%20Targeted%20advertising%20%20media%22.

* cited by examiner

CONTEXTUAL TELEVISION ADVERTISEMENT DELIVERY

BACKGROUND

With the advent of new technology, various new forms of television content delivery methods have been developed. One example of these delivery methods is the delivery of television content via Video on Demand (VOD) systems.

In contrast to a conventional television delivery system that broadcasts the same content to all the viewers, a VOD system is an interactive television system that is able to adapt and tailor its content delivery method to fit a user's needs.

In particular, among other functionalities, a VOD system allows a user to request specific television content, such as a movie, that the user desires to view. In one example, upon receiving a user request for a movie, the movie is forwarded from a VOD server to a set-top box. A user can watch the movie via a "streaming mode" that allows viewing while the movie is being downloaded. Alternatively, a user can watch the movie at a later time after the entire content of the movie has been downloaded.

Because VOD systems offer new functionalities and an improved range of interactivity, VOD systems present novel advertisement opportunities that traditional forms of television advertisement techniques fail to fully exploit. More specifically, traditional television advertisement techniques are not adapted to the interactive nature of user interfaces associated with VOD systems.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various technologies for delivering contextual television advertisement are described. A user selection of a media title (e.g., a VOD movie) is received. The media title has an associated set of contextual metadata that includes information regarding the media title, such as the genre of a VOD movie. A request for the media title is forwarded to a first server, and an advertisement request including the set of contextual metadata is forwarded to a second server. The second server uses the set of contextual metadata (e.g., action films) to retrieve contextual television advertisement information. The advertisement may be associated with a title by way of one or more of the title's metadata attributes. In one example, if a VOD movie requested falls under the "action" genre, the contextual television advertisement information may be a movie trailer for another VOD movie under the "action" genre or product advertisement that is associated with the "action" genre. The contextual television advertisement information and the media title are received from the second server and the first server respectively. Also, the contextual television advertisement information and the media title are played. Optionally, the contextual television advertisement information is played immediately before and/or immediately after the media title. Contextual advertisement information may include advertisement content, such as a still image, an advertisement interface, interaction models, and/or references to more advertisement content, such as streaming video content.

In at least this way, embodiments allow contextual television advertisement to be strategically placed to create new advertising, to create new advertising revenue that complements traditional local advertising, and to provide advertising that is appreciably less obtrusive to a user's television viewing experience than traditional advertising. Moreover, embodiments utilize metadata associated with a user's requested media title to select advertisement information that can more effectively target the user by leveraging contextual information, such as the user's viewing history.

DETAILED DESCRIPTION OF THE DRAWINGS

Reference will now be made in detail to various embodiments, examples of which are illustrated in the accompanying drawings. While the claimed subject matter will be described in conjunction with these embodiments, it will be understood that they are not intended to limit the claimed subject matter to these embodiments. On the contrary, the claimed subject matter is intended to cover alternatives, modifications and equivalents, which may be included within the spirit and scope of the claimed subject matter as defined by the appended claims. Furthermore, in the following detailed description of the present claimed subject matter, numerous specific details are set forth in order to provide a thorough understanding of the present claimed subject matter. However, it will be evident to one of ordinary skill in the art that the present claimed subject matter may be practiced without these specific details. In other instances, well known methods, procedures, components, and circuits have not been described in detail as not to unnecessarily obscure aspects of the claimed subject matter.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of usage, to refer to these signals as bits, bytes, values, elements, symbols, characters, terms, numbers, or the like.

It should be understood, however, that all of these and similar terms are to be associated with the appropriate physical quantities and are merely convenient labels applied to these quantities. Unless specifically stated otherwise as apparent from the following discussions, it is appreciated that throughout the present claimed subject matter, discussions utilizing terms such as "receiving," "forwarding," "playing," "displaying," "correlating," or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

Unlike traditional television advertisement techniques that are not adapted to the interactive nature of VOD and Digital Video Recorder (DVR) systems, embodiments extract contextual information from a user selected media title to select advertisement material that can more effectively target users. Moreover, in some embodiments, the contextual advertisement material is inserted immediately before and after a media title to re-enforce its impact.

Figure 1:
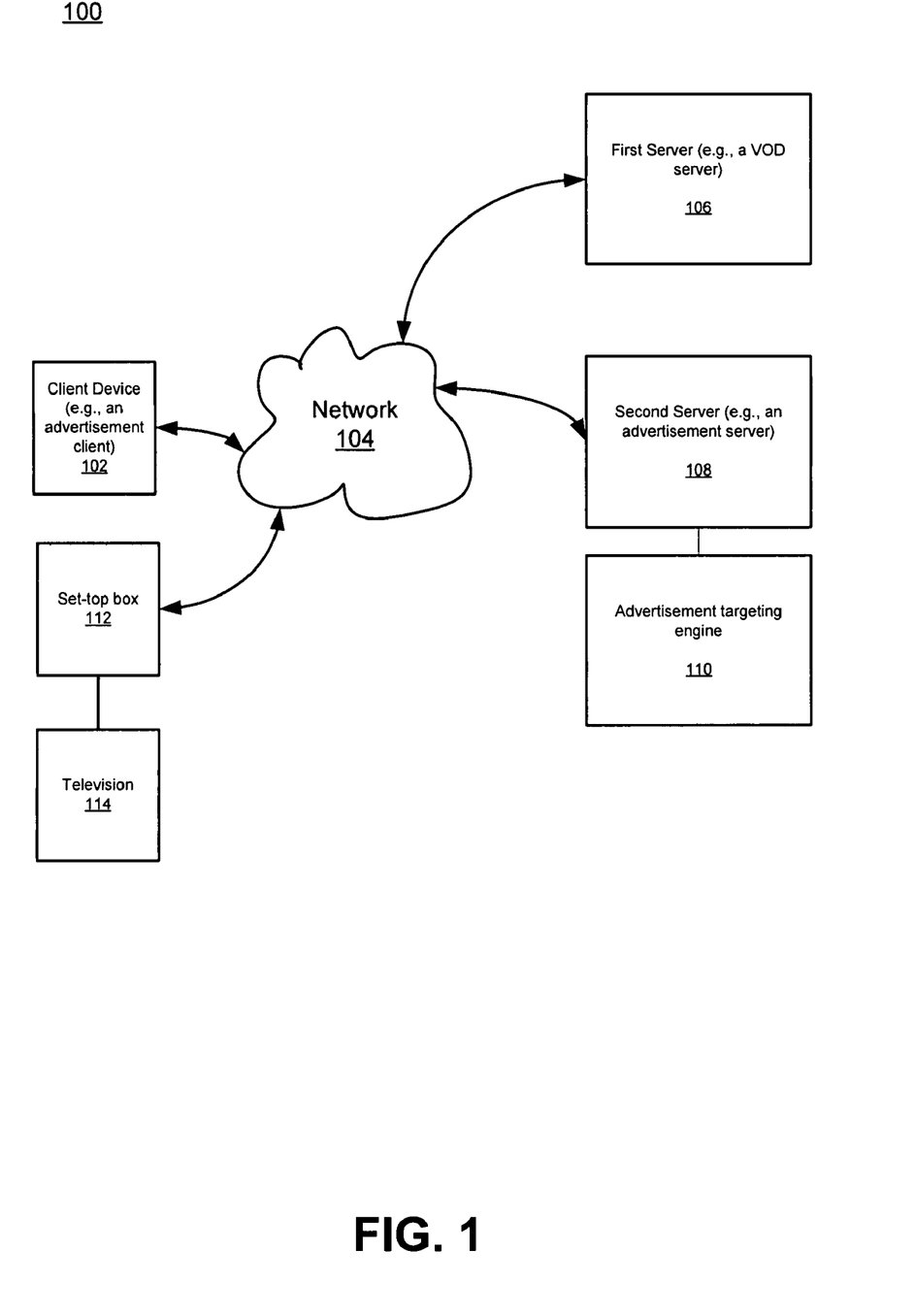
FIG. 1 illustrates a contextual television advertisement delivery system, upon which embodiments can be implemented.

FIG. 1 illustrates a contextual television advertisement delivery system 100, upon which embodiments can be implemented. System 100 includes a client device 102, a first server 106, a second server 108, a set-top box 112, a television 114, and an advertisement targeting engine 110. Also, although contextual television advertisement delivery system 100 is shown and described as having certain numbers and types of elements, embodiments are not so limited; that is, contextual television advertisement delivery system 100 may include elements other than those shown, and may include more than one of the elements that are shown. Furthermore, although contextual television advertisement delivery system 100 illustrates the first server 106 and the second server 108 as two distinct entities, in some embodiments the first server 106 is combined with the second server 108. In one implementation, both movie content and advertisement content reside on a common server. Movie and advertisement metadata reside in a common database. For practical reasons advertisement content and movie content are almost identical. A property that an advertisement may have that movies usually don't have is that advertisements may be hidden, i.e., the advertisements can not be discovered by the user via the VOD library browser. That said, certain advertisements may be visible and discoverable. Additionally, although client device 102 and set-top box 112 are shown in FIG. 1 as two separate components, in some embodiments, client device 102 and set-top box 112 are combined into a single component capable of performing the functions of client device 102 and set-top box 112.

The client device 102 (e.g., an advertisement client), the first server (e.g., a VOD server), the second server 108 (e.g., an advertisement server), and the set-top box 112 are communicatively coupled with each other via network 104. Network 104 can include various local area networks (LAN's), metropolitan area networks (MAN's), wide area network (WAN's), and/or the Internet. Network 104 may also be a hybrid fiber coax (HFC) network as in the case of many cable systems. Client/Server two way communications may take place over the out of band (OOB) or via DOCSIS or via DSL such as in the case of hybrid networks. Also, the set-top box 112 (e.g., an IP set-top box) is coupled with a television configured for displaying media titles (e.g., VOD movies). Additionally, the second server 108 is coupled with the advertisement targeting engine. The components of system 100 cooperatively operate to deliver contextual television advertisement information and advertisement content.

In one exemplary embodiment, a user watching television 114 inputs a request for a media title. The request for the media title is processed by the set-top box 112 and forwarded to the client device 102 and the first server 106. The request includes contextual metadata information. Contextual metadata information can include, but are not limited to, the user's viewing history, the user's VOD purchase history, the user's demographic information, the user's geographic information, and/or the metadata associated with the title the user ordered.

In response to receiving the request for the media title, client device 102 forwards an advertisement request including the contextual metadata information to the second server 108, which is communicatively coupled with advertisement targeting engine 110. The advertisement targeting engine 110 processes the contextual metadata information and selects advertisement information. In one example, the second server 108 responds to the advertisement request with advertisement information that originates from a VOD category associated with the VOD category from which the user ordered the media title. In one example, the advertisement targeting engine 110 maintains an association table that maps VOD movie categories with VOD advertisement categories. The selected advertisement information is forwarded to the set-top box 112. The selected advertisement information, in one example, is played immediately before and/or immediately after the media title. The client can use the selected advertisement information to invoke advertisement playback from the server.

Figure 2:
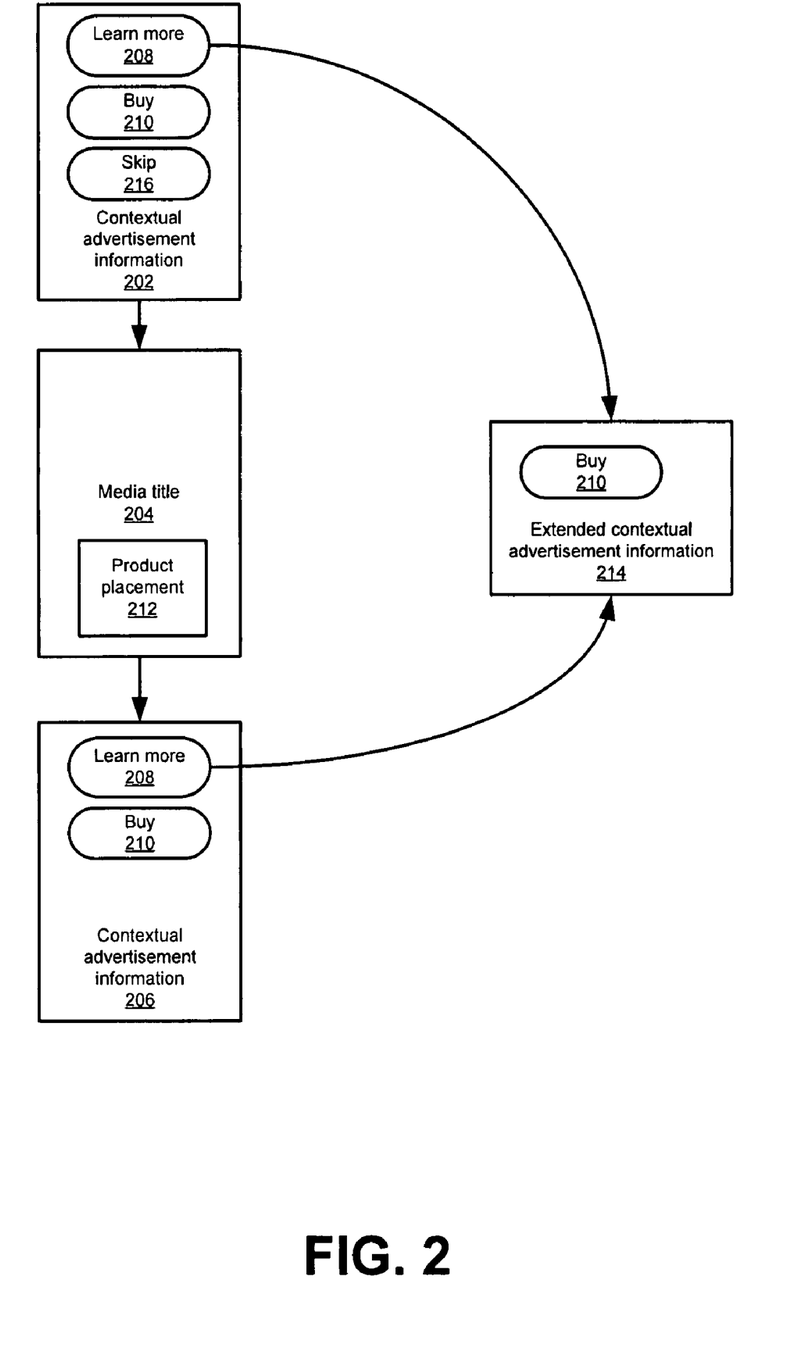
FIG. 2 illustrates conceptual block diagrams of a contextual advertisement delivery method that includes an option for accessing an extended version of contextual advertisement information.

FIG. 2 illustrates conceptual block diagrams of a contextual advertisement delivery method that includes an option for accessing an extended version of contextual advertisement information. In one embodiment, the contextual advertisement information 202 is displayed immediately prior to the media title 204 (e.g., a VOD movie). The contextual advertisement information 202 includes a "learn more" icon 208, a "buy" icon 210, and a "skip" icon 216. The "skip" icon 216, when selected, immediately terminates the contextual advertisement information 202 and brings the user to the next advertisement in the sequence or begins playing media title 204. The "buy" icon 210, when selected, allows a user to purchase a product shown in the contextual advertisement information 202. The "learn more" icon 208, when selected, causes the extended contextual advertisement 214 to be displayed. The extended contextual advertisement 214 also includes a "buy" icon 210.

In one example embodiment, the contextual advertisement 202 shows a product (e.g., a car) that appears naturally in the media title (e.g., a DVR content). Specifically, the natural appearance of the car is referred to as the product placement 212.

The existence of product placement 212 in media title 214, in one example, is described by a set of contextual metadata. Thus, advertisement information (e.g., contextual advertisement information 202 and/or contextual advertisement information 206) that appears immediately before and after (also referred to as bumper advertisement) the media title 204 can be specifically chosen as to leverage the existence of product placement 212.

In one embodiment, after the media title is finished playing, the contextual advertisement information 206 is displayed. Contextual advertisement information 206, in one embodiment, advertises the same product shown in contextual advertisement information 202. In another embodiment, contextual advertisement information 206 advertises a contextually related product different from the product shown in contextual advertisement information 202.

In one example scenario, a user is first exposed to a brief version of an advertisement, such as a one minute XYZ car advertisement. The XYZ car advertisement is chosen because the XYZ car also appears in the movie. Upon completion of the brief version advertisement, the movie plays uninterrupted. At the point of the movie where it shows the XYZ car, the user is unobtrusively reminded again of the XYZ car. Upon completion of the movie, a still version of the XYZ car advertisement is displayed with an option for the user to learn more about the car. If the option is selected, the user is shown an extended version of the XYZ car advertisement. Thus, by strategically using product placement in conjunction with bumper advertisement techniques, a user is repeatedly shown a product that he or she may be interested in without disrupting the user's overall viewing experience.

Figure 3:
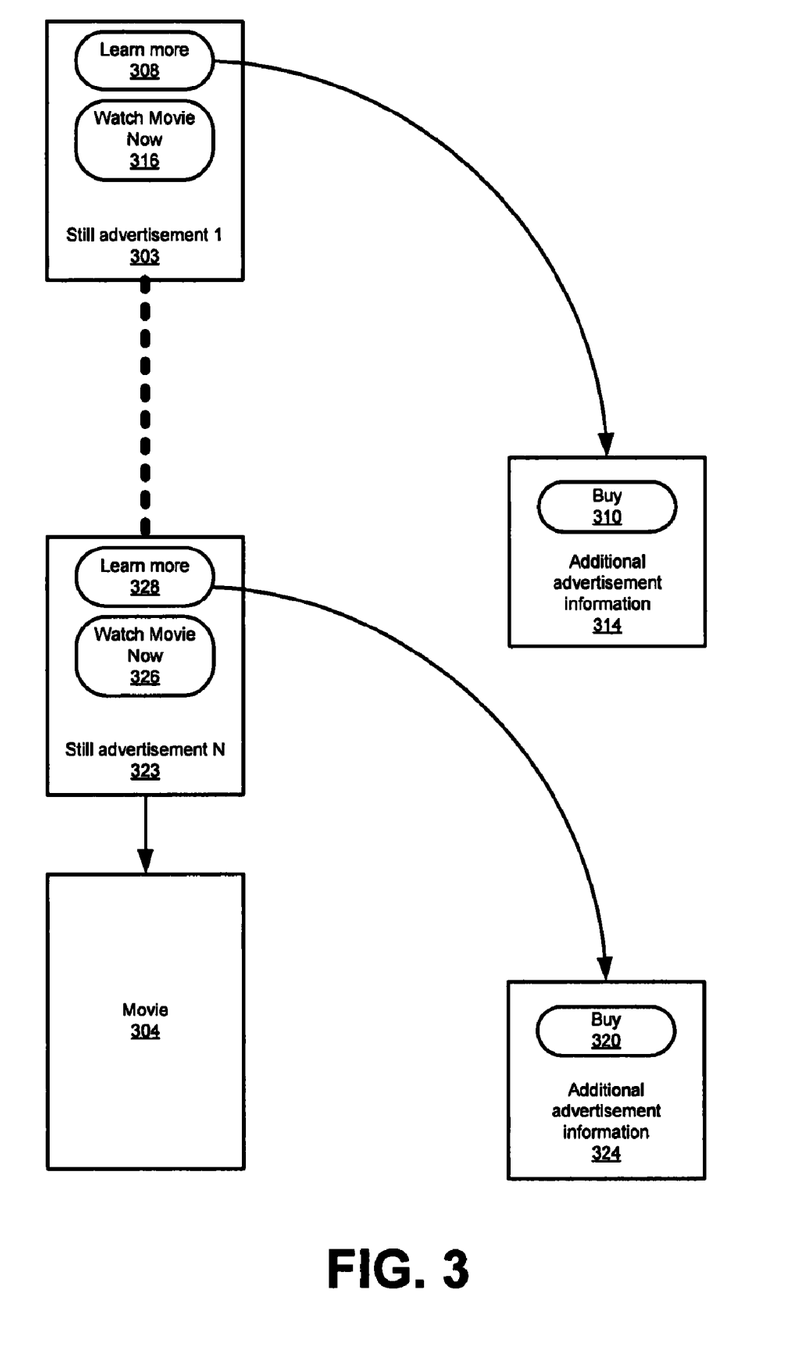
FIG. 3 illustrates conceptual block diagrams of a contextual advertisement delivery method that includes displaying one or more still advertisements.

FIG. 3 illustrates conceptual block diagrams of a contextual advertisement delivery method that includes displaying one or more still advertisements. FIG. 3 includes a still advertisement 1 303, a still advertisement N 323, a movie 304, an additional advertisement information 314 with "buy" option 310, and an additional advertisement information 324 with "buy" option 320. Also, still advertisement 1 303 includes a "learn more" option 308 and a "watch movie now" option 315. Similarly, still advertisement N 323 includes a "learn more" option 328 and a "watch movie now" option 325.

In one example, still advertisement 1 303 through still advertisement N 323 are shown in a slide show fashion immediately before the movie 304 is played. In one example, still advertisement 1 303 through still advertisement N 323 are all contextually related to the movie 304. In one example, if at anytime a "watch movie now" option (e.g., "watch movie now" option 316) is selected, the current still advertisement information being shown is immediately terminated. Also, the remaining still advertisement information is bypassed to allow the movie to be played without further delay. Moreover, at anytime a "learn more" option (e.g., "learn more" option 328) is selected, a user is shown additional advertisement information, such as additional advertisement information 314 and 324.

Figure 4:
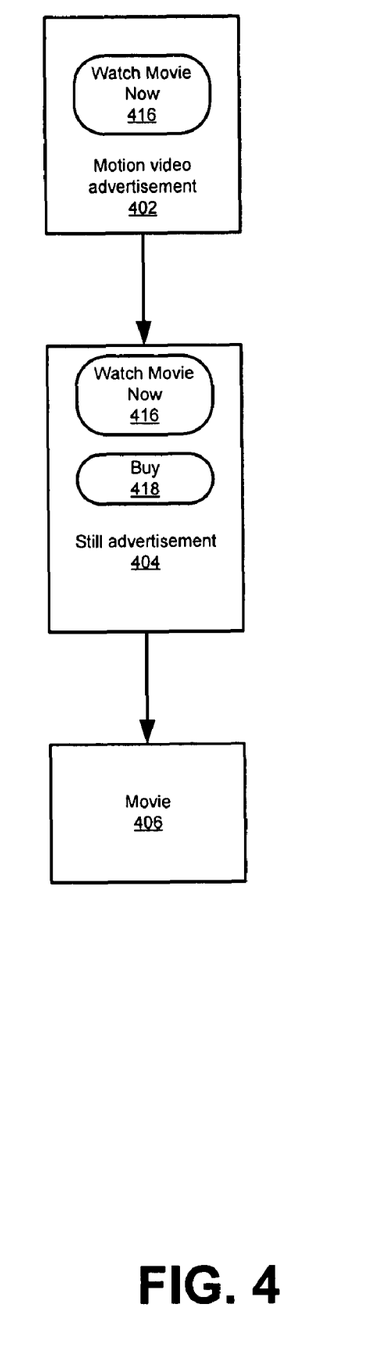
FIG. 4 illustrates conceptual block diagrams of a contextual advertisement delivery method that includes a motion video advertisement.

FIG. 4 illustrates conceptual block diagrams of a contextual advertisement delivery method that includes a motion video advertisement. FIG. 4 includes a motion video advertisement 402 having a "watch movie now" option 416, a still advertisement 404 having a "watch movie now" option 416 and a "buy" option 418, and a movie 406.

In one embodiment, a motion video advertisement 402 (e.g., a movie trailer) that is contextually associated with the movie 406 is played prior to the movie 406. If the user desires to skip the motion video advertisement 402, the user can, in one example, select the "watch movie now" option 416 and bypass the motion video advertisement 402 and still advertisement 404.

In one embodiment, upon completion of the motion video advertisement 402, a still advertisement 404 is shown to provide the user with an opportunity to purchase the movie shown in the motion video advertisement 402. In one example, a user can purchase the movie by selecting the "buy" 418 option.

Figure 5A:
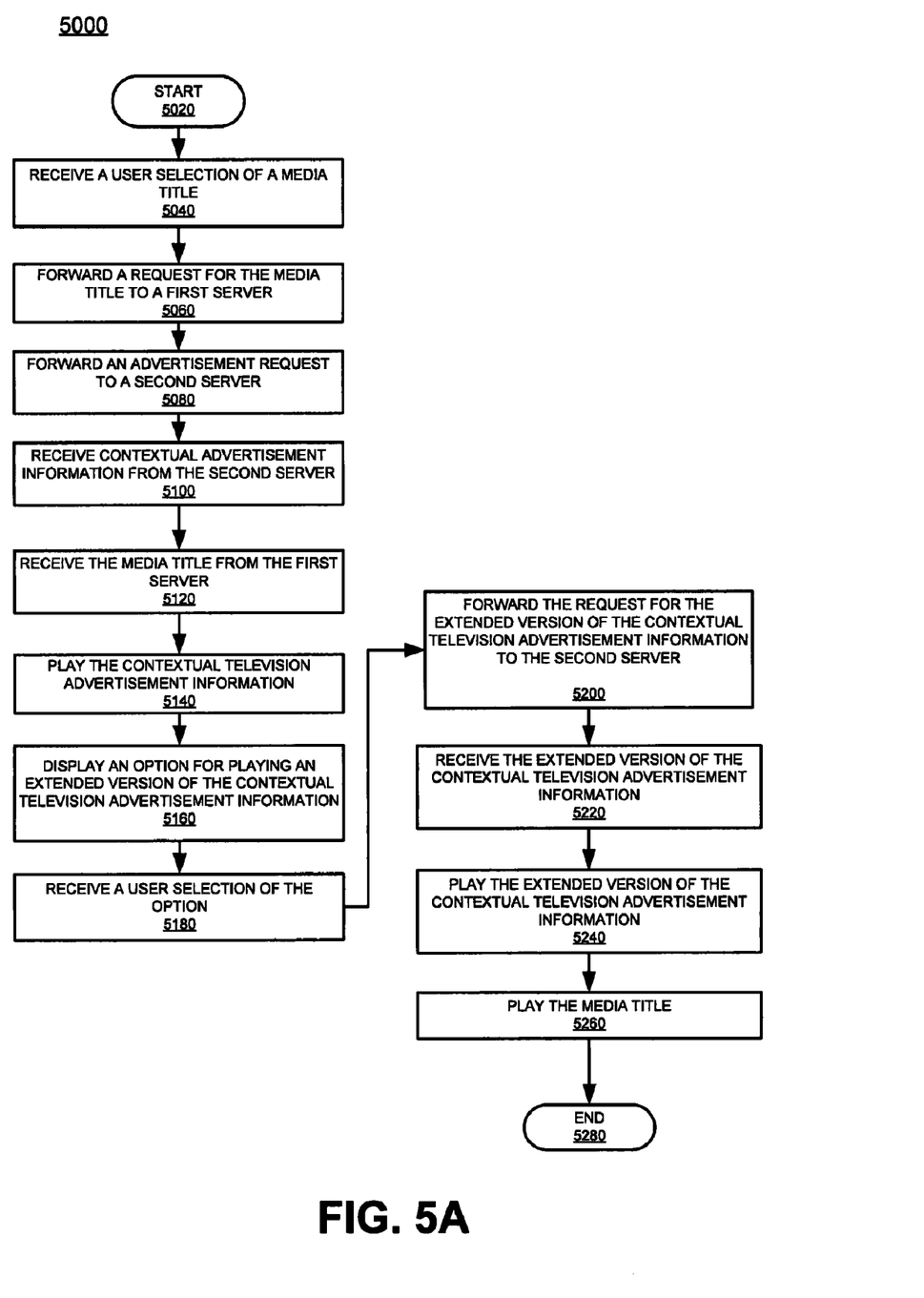
FIG. 5A illustrates a flowchart of a method of delivering contextual advertisement information, including playing an extended version of the contextual advertisement information.

FIG. 5A illustrates a flowchart 5000 of a method of delivering contextual advertisement information, including playing an extended version of the contextual advertisement information. Although specific steps are disclosed in flowchart 5000, such steps are exemplary. That is, embodiments are well suited to performing various other or additional steps or variations of the steps recited in flowchart 5000. It is appreciated that the steps in flowchart 5000 can be performed in an order different than presented.

At block 5020, the process starts. At block 5040, a user selection of a media title (e.g., a television show) associated with a set of contextual metadata is received. At block 5060, a request for the media title (e.g., an action movie) is forwarded to a first server (e.g., a VOD server).

At block 5080, an advertisement request including the set of contextual metadata is forwarded to a second server (e.g., an advertisement server). The second server utilizes the set of contextual metadata to retrieve contextual television advertisement information, for a movie trailer of another action movie. In one exemplary embodiment, the contextual television advertisement information is referenced using VOD metadata. Also, in one embodiment, the second server is communicatively coupled with an advertisement target engine that correlates the set of contextual metadata to contextual television advertisement information.

At block 5100, the contextual television advertisement information is received from the second server. In one embodiment, the media title is a first motion picture and the contextual television advertisement information references a trailer for a second motion picture. Also, the first motion picture is contextually related to the second motion picture.

At block 5120, the media title is received from the first server. At block 5140, the contextual television advertisement information is played. In one embodiment, the contextual television advertisement information includes an option that when selected immediately terminates the advertisement presentation and automatically proceeds to playing the media title. In one embodiment, the contextual television advertisement information is played immediately prior to playing of the media title. In one embodiment, the contextual television advertisement information is played immediately after playing of the media title.

At block 5160, an option for playing an extended version of the contextual television advertisement information is displayed on the contextual television advertisement information. At block 5180, a user selection of the option is received. At block 5200, a request for the extended version of the contextual television advertisement information is forwarded to the second server.

At block 5220, the extended version of the contextual television advertisement information is received. At block 5240, the extended version of the contextual television advertisement information is played. In one embodiment, the extended version of the contextual television advertisement information illustrates a product that appears in the media title. At block 5260, the media title is played. At block 5280, the process ends.

Figure 5B:
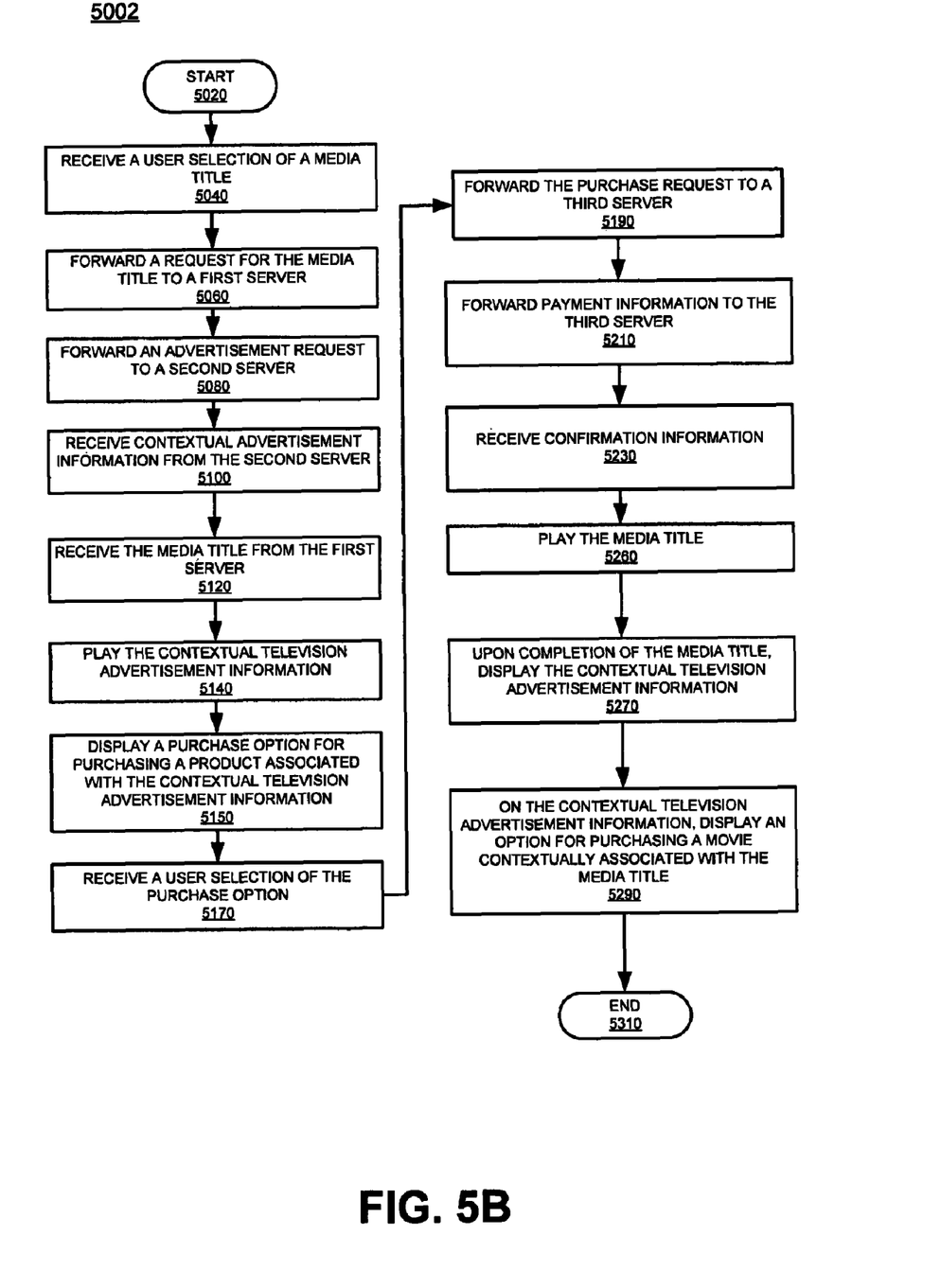
FIG. 5B illustrates a flowchart of a method of delivering contextual advertisement information, including displaying an option for purchasing a movie.

FIG. 5B illustrates a flowchart 5002 of a method of delivering contextual advertisement information, including displaying an option for purchasing a movie. With reference to flowchart 5002, it is noted that blocks 5020, 5040, 5060, 5080, 5100, 5120, and 5140 are identical to FIG. 5A. The difference begins at block 5150.

At block 5150, a purchase option for purchasing a product associated with the contextual television advertisement information is displayed on the contextual television advertisement information. In one example, the product is an item that is subsequently shown in the media title. For instance, the contextual television advertisement information can be an advertisement regarding a necklace that appears in a VOD movie.

At block 5170, a user selection of the purchase option is received. At block 5190, a purchase request is forwarded to a third server (e.g., a payment processing server). At block 5210, payment information, such as credit card or subscriber account information, is forwarded to the third server. At block 5230, confirmation information regarding the purchase request is received from the third server. At block 5260, the media title is played.

At block 5270, upon completion of the media title, follow-up media title contextual television advertisement information is displayed. The follow-up media title contextual television advertisement information can be the same or different from the pre-media title contextual television advertisement information. At block 5290, on the follow-up contextual television advertisement information, an option for purchasing a movie contextually associated with the media title is displayed. At block 5310, the process ends.

Figure 6:
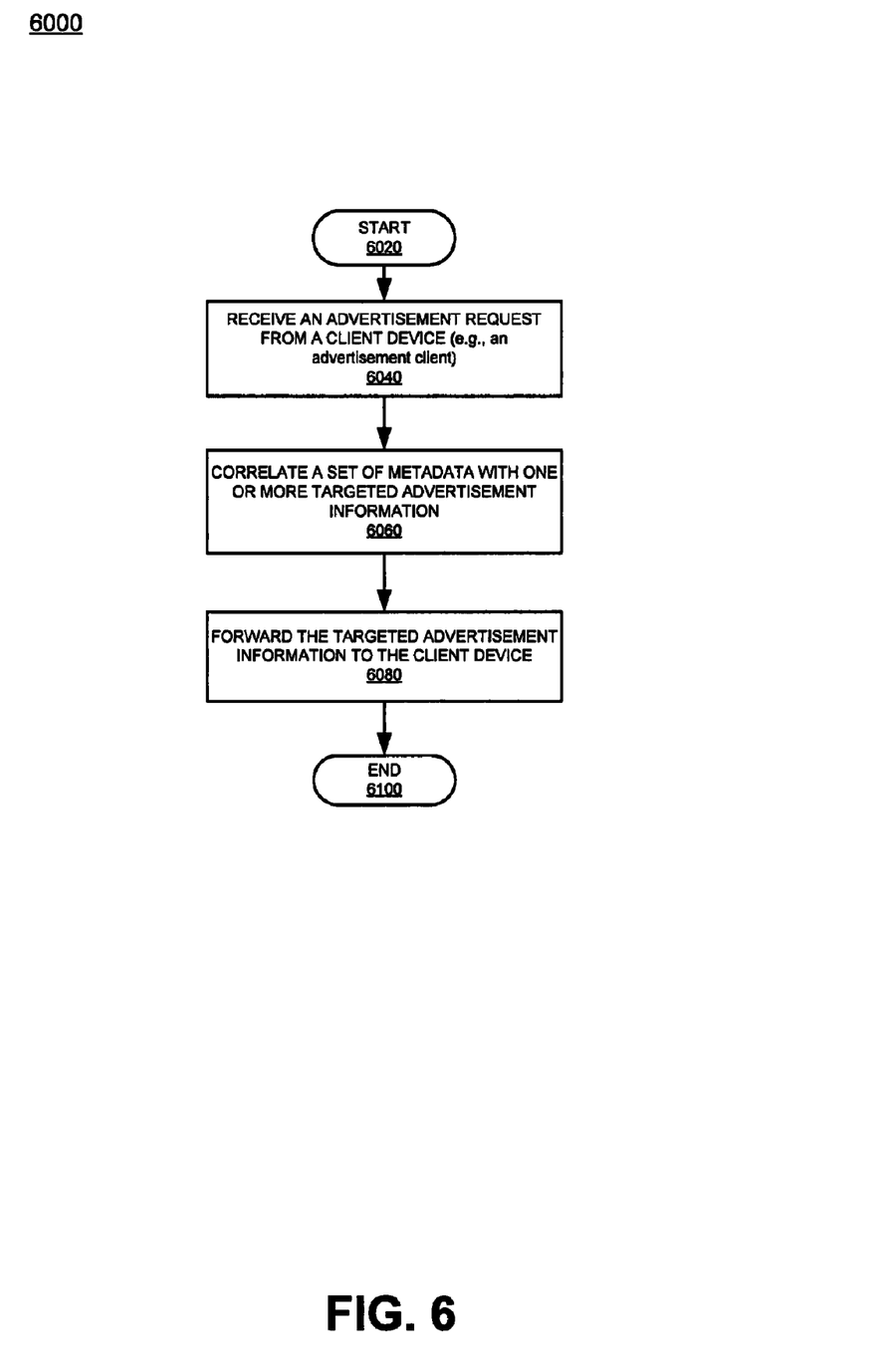
FIG. 6 illustrates a flowchart of a method of delivering contextual advertisement information to a client device.

FIG. 6 illustrates a flowchart 6000 of a method of delivering contextual advertisement information to a client device. At block 6020, the process starts. At block 6040, an advertisement request from a client device, such as an advertisement client, is received. The advertisement request includes a set of contextual metadata associated with a media title (e.g., a VOD movie). Also, in one example, the set of contextual metadata describes which category/genre the media title is from.

At block 6060, the set of contextual metadata is correlated with targeted advertisement information. The set of contextual metadata can include demographic information of a user, order history information of a user, geographic information of a user, and/or navigational history of a user. In one example, by using one or more aspects of the set of contextual metadata, an advertisement targeting engine can effectively choose targeted advertisement information that is associated with the context of the media title. In one example, the set of contextual metadata may indicate that a product placement for a perfume ABC exists in the media title. With this information, the advertisement targeting engine can choose one or more perfume ABC advertisement information and deliver it to the client device. Furthermore, in some instances, more than one advertisement may be appropriate for a media title. In one example, when more than one advertisement is appropriate for a media title, the available advertisement is rotated and delivered in an alternating fashion.

At block 6080, the targeted advertisement information is forwarded to the client device. The targeted advertisement information can be a video advertisement and/or a still advertisement. The client device also can use the targeted advertisement information to invoke the actual advertisement. At block 6100, the process ends.

Figure 7:
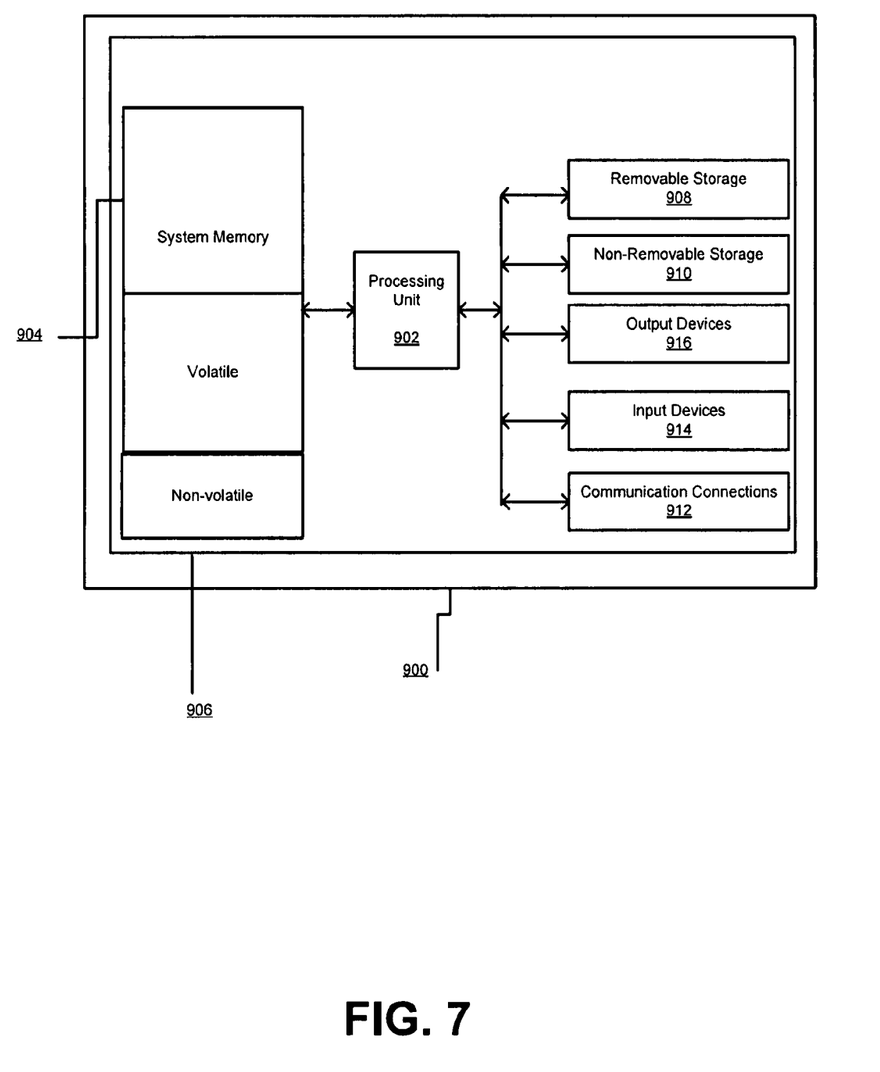
FIG. 7 illustrates an exemplary computing device with which the disclosed subject matter can be implemented.

FIG. 7 illustrates an exemplary computing device 900 for implementing the claimed subject matter. In its most basic configuration, computing device 900 typically includes at least one processing unit 902 and memory 904. Depending on the exact configuration and type of computing device, memory 904 may be volatile (such as RAM), non-volatile (such as ROM, flash memory, etc.) or some combination of the two. This most basic configuration is illustrated in FIG. 9 by dashed line 906. Additionally, device 900 also may have additional features/functionality. For example, device 900 may also include additional storage (removable and/or non-removable) including, but not limited to, magnetic or optical disks or tape. Such additional storage is illustrated in FIG. 9 by removable storage 908 and non-removable storage 910.

Computer storage media includes volatile and nonvolatile, removable and non-removable media implemented in any method or technology for storage of information such as computer readable instructions, data structures, program modules or other data. Memory 904, removable storage 908, and non-removable storage 910 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 900. Any such computer storage media may be part of device 900. Device 900 may be utilized to execute computer-executable instructions for performing the steps of a media selection application program.

Device 900 also may contain communications connection(s) 912 that allow the device to communicate with other devices. In one example, device 900 is communicatively coupled with a set-top box. Communications connection(s) 912 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 900 also may have input device(s) 914 such as keyboard, mouse, pen, voice input device, touch input device, etc. Output device(s) 916 such as a display, speakers, printer, etc. may also be included. All these devices are well known in the art and will not be discussed at length herein.

Embodiments allow contextual television advertisement to be strategically inserted to create new advertising that is appreciably less obtrusive to a user's television viewing experience than other advertising. Moreover, embodiments use metadata associated with a user's requested media title to select advertisement information that can more effectively target the user by leveraging contextual information, such as the user's viewing history, purchasing history, and/or the user's geographic information.

In the foregoing specification, embodiments have been described with reference to numerous specific details that may vary from implementation to implementation. Thus, the sole and exclusive indicator of what is, and is intended by the applicants to be the claimed subject matter is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:
1. A method, comprising:
receiving data indicating selection of a media title;
forwarding a request for the media title to a first server;
obtaining contextual metadata associated with the media title, the contextual metadata indicating a product appearing in the media title and title information indicating a title of the media title;

forwarding an advertisement request comprising the contextual metadata to a second server;

receiving, from the second server,
- a first contextual advertisement relating to the product and the title information and comprising information relating to the product, and
- a second contextual advertisement relating to the product and the title information, the second contextual advertisement comprising an extended version of the first version of the contextual advertisement information and comprising additional information associated with the product;

receiving the media title from the first server;

playing the first contextual advertisement;

displaying, with the first contextual advertisement, a first option for terminating playing of the first contextual advertisement and playing the media title, and a second option for accessing the additional information associated with the product;

upon completion of playing the first contextual advertisement, playing the media title;

upon completion of playing the media title, playing the second contextual advertisement; and displaying with the second contextual advertisement a third option for purchasing the product, wherein the contextual metadata further comprises data identifying a movie contextually associated with the media title, and wherein playing the second contextual advertisement comprises displaying a fourth option for purchasing the movie.

2. The method of claim 1, further comprising:
receiving a user selection of the third option;
forwarding a purchase request to a third server;
forwarding payment information to the third server; and
receiving confirmation information regarding the purchase request from the third server.

3. The method of claim 1, wherein completion of the first contextual advertisement comprises selection of the first option.

4. The method of claim 1, wherein the first contextual advertisement is played immediately prior to playing the media title.

5. The method of claim 1, wherein the media title is a first motion picture, and wherein the movie is a second motion picture that is contextually related to the first motion picture.

6. The method of claim 5, further comprising displaying an option to view a trailer relating to the second motion picture.

7. The method of claim 1, wherein the contextual metadata further comprises demographic information corresponding to a user associated with the request to play the media title, order history information corresponding to the user, geographic information corresponding to the user, and navigational history associated with the user.

8. A computer storage medium that is not a signal, the computer storage medium having computer-executable instructions stored thereon that, when executed by a computer, cause the computer to:

receive a request to play a media title;

forward, to a first server, a request for the media title;

obtain contextual metadata associated with the media title, the contextual metadata indicating a product appearing in the media title and title information indicating a title of the media title;

generate an advertisement request comprising the contextual metadata to a second server;

receive, from the second server, a first contextual advertisement relating to the product and the title information and comprising information relating to the product, and a second contextual advertisement relating to the product and the title information, the second contextual advertisement comprising an extended version of the first version of the contextual advertisement information and comprising additional information associated with the product;

receive the media title from the first server;

play the first contextual advertisement;

display, with the first contextual advertisement, a first option for terminating playing of the first contextual advertisement and playing the media title, and a second option for accessing the additional information associated with the product;

upon completion of playing the first contextual advertisement, play the media title; and upon completion of playing the media title, play the second contextual advertisement; and display with the second contextual advertisement a third option for purchasing the product, wherein the contextual metadata further comprises data identifying a movie contextually associated with the media title, and wherein playing the second contextual advertisement comprises displaying a fourth option for purchasing the movie.

9. The computer storage medium of claim 8, wherein the first contextual advertisement comprises a video advertisement relating to the product.

10. The computer storage medium of claim 8, wherein the first contextual advertisement comprises a still image advertisement relating to the product.

11. The computer storage medium of claim 8, wherein the contextual metadata further comprises demographic information corresponding to a user associated with the request to play the media title.

12. The computer storage medium of claim 8, wherein the set of contextual metadata further comprises order history information of a user associated with the request to play the media title.

13. The computer storage medium of claim 8, wherein the set of contextual metadata further comprises geographic information corresponding to a user associated with the request to play the media title.

14. The computer storage medium of claim 8, wherein the set of contextual metadata further comprises navigational history associated with a user associated with the request to play the media title.

15. The computer storage medium of claim 8, wherein the contextual metadata further comprises demographic information corresponding to a user associated with the request to play the media title, order history information corresponding to the user, geographic information corresponding to the user, and navigational history associated with the user.

16. A method comprising:
receiving, at a set top box, data indicating selection of a motion picture;
forwarding a request for the motion picture to a video on demand server;
obtaining contextual metadata associated with the motion picture, the contextual metadata indicating a product appearing in the motion picture, motion picture title information, and geographic information corresponding to a user associated with the set top box;

forwarding an advertisement request comprising the contextual metadata to an advertisement server;
receiving, from the advertisement server,
 a first contextual advertisement relating to the product and the motion picture title information and comprising information relating to the product, the first contextual advertisement comprising a video advertisement, and
 a second contextual advertisement relating to the product and the motion picture title information, the second contextual advertisement comprising an extended version of the first version of the contextual advertisement information and comprising additional information associated with the product;
receiving the motion picture from the video on demand server;
playing the first contextual advertisement;
displaying, with the first contextual advertisement, a first option for terminating playing of the first contextual advertisement and playing the motion picture, and a second option for accessing the additional information associated with the product;
in response to receiving selection of the first option, immediately terminating playing of the first contextual advertisement and playing the motion picture;
upon completion of playing the motion picture, playing the second contextual advertisement; and
displaying with the second contextual advertisement a third option for purchasing the product, wherein the contextual metadata further comprises data identifying a movie contextually associated with the media title, and wherein playing the second contextual advertisement comprises displaying a fourth option for purchasing the movie.

17. The method of claim 16, further comprising:
receiving data corresponding to a selection of the third option; and
forwarding a purchase request to a third server.

18. The method of claim 16, wherein the contextual metadata further comprises demographic information corresponding to the user, order history information corresponding to the user, and navigational history associated with the user.

* * * * *